Figure 1:
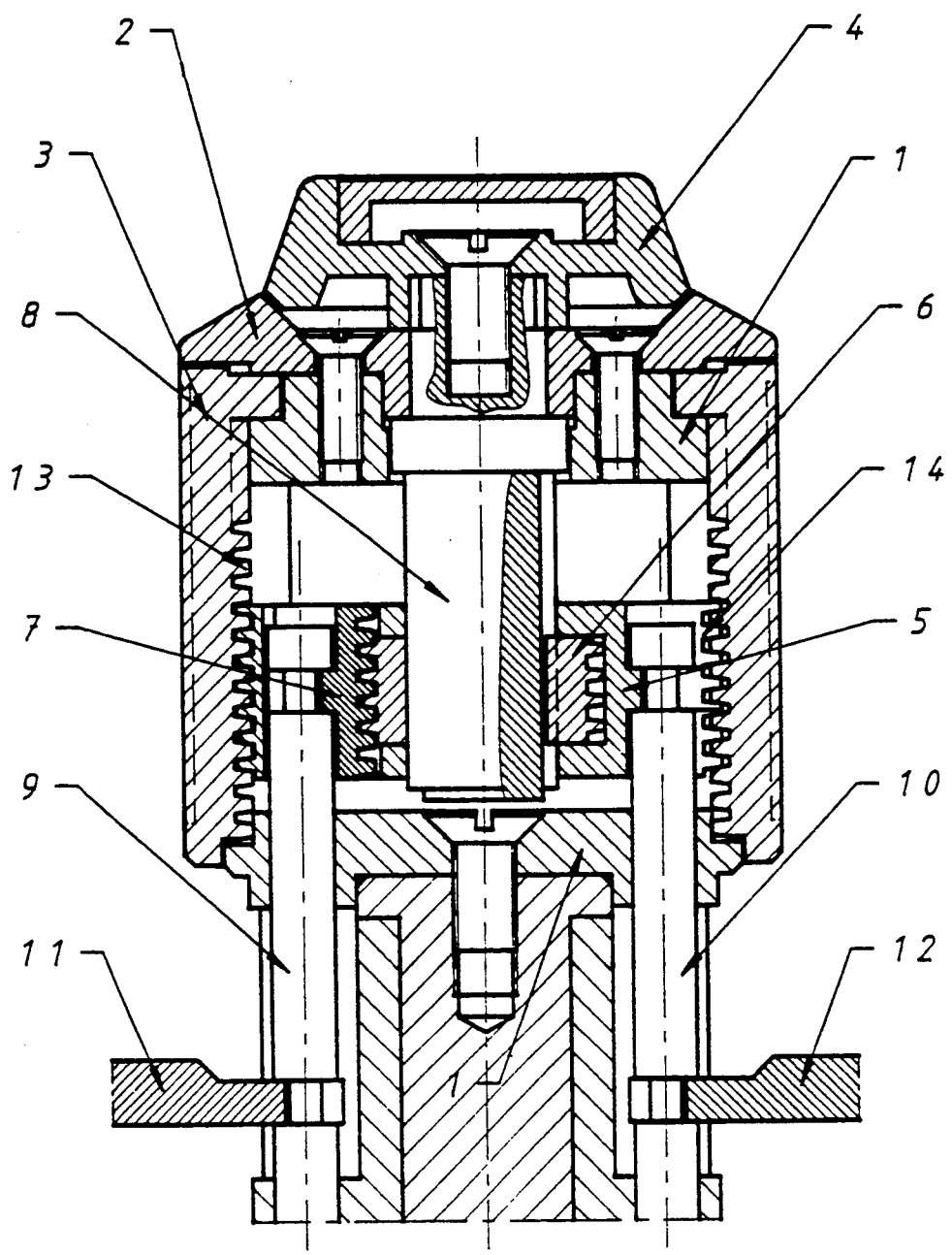

United States Patent [19]

Riedl

[11] Patent Number: 5,267,079
[45] Date of Patent: Nov. 30, 1993

[54] BINOCULARS INCLUDING SEPARATE FOCUSING AND DIOPTER ADJUSTMENT

[75] Inventor: Bernhard Riedl, Wattens, Austria

[73] Assignee: D. Swarovski & Co., Wattens, Austria

[21] Appl. No.: 885,303

[22] Filed: May 18, 1992

[30] Foreign Application Priority Data

Jul. 24, 1991 [DE] Fed. Rep. of Germany ....... 4124584

[51] Int. Cl.⁵ .............................................. G02B 7/06
[52] U.S. Cl. .................................. 359/418; 359/414
[58] Field of Search ............... 359/414, 416, 417, 418, 359/425, 426

[56] References Cited

U.S. PATENT DOCUMENTS 3,484,149 12/1969 Becker et al. ........................ 359/414
4,750,823 6/1988 Riedl ................................... 359/414

FOREIGN PATENT DOCUMENTS

416346A2 8/1990 European Pat. Off. .
207332 1/1991 European Pat. Off. .

Primary Examiner—Jon W. Henry
Attorney, Agent, or Firm—Fay, Sharpe, Beall, Fagan, Minnich & McKee

[57] ABSTRACT

Binoculars having a central device for focusing and diopter adjustment wherein the diopter adjusting wheel is integrated into the face of the focusing drive wheel, whereby the focusing and the diopter adjustment can be performed independently of each other.

2 Claims, 2 Drawing Sheets

BINOCULARS INCLUDING SEPARATE FOCUSING AND DIOPTER ADJUSTMENT

The invention relates to binoculars having a central device for focusing and diopter adjustment.

Binoculars having a central focusing device are known from and European patent no. 207 332 and European patent application no. 416 346. However there is still a need for central focusing devices for binoculars which are characterized by few single parts and simple assembly and have low faultiness.

The invention is based on the finding that one can provide a central focusing device for binoculars having a diopter adjusting wheel integrated into the focusing wheel, which is characterized by a divided bridge with one bridge member being axially displaceable in the other bridge member.

The object of the invention is binoculars having a central device for focusing and diopter adjustment wherein a focusing drive wheel is mounted rotatably on a drive wheel housing, one bridge member is axially displaceable via an inside thread of the focusing drive wheel and an outside thread of said bridge member, said bridge member is connected with a first connecting rod, on the one hand, and axially coupled with another connecting rod via a threaded segment and a threaded spindle, on the other hand, the threaded spindle is driven via a rotatably mounted diopter adjusting wheel and a coupling shaft connected therewith, the threaded spindle communicating with the coupling shaft is mounted free from play in the bridge member in the axial direction, and upon operation of the diopter adjusting wheel the threaded segment guided in the bridge member is movable in the axial direction, and the threaded segment is connected with the other connecting rod.

According to a preferred embodiment the diopter adjusting wheel is mounted rotatably over a diopter scale ring.

The inventive binoculars are characterized by the fact that the central focusing device comprises few single parts and can be mounted very simply and adjusted simply after assembly.

It must be specially emphasized that the diopter adjusting wheel is integrated into the focusing wheel, which results in good handling as well as a pleasing design.

The focusing drive wheel and the diopter adjusting wheel are located on one axis and disposed on the same side of the binoculars.

Faultiness is extremely low due to the large diameters of the threads, and there is no lost motion due to the lack of compensating play.

The diopter adjustment is easy to read on the scale ring, which also has the advantage that the latter is stationary.

The invention shall be explained in more detail below with reference to the drawing showing a preferred embodiment.

Figure 2:
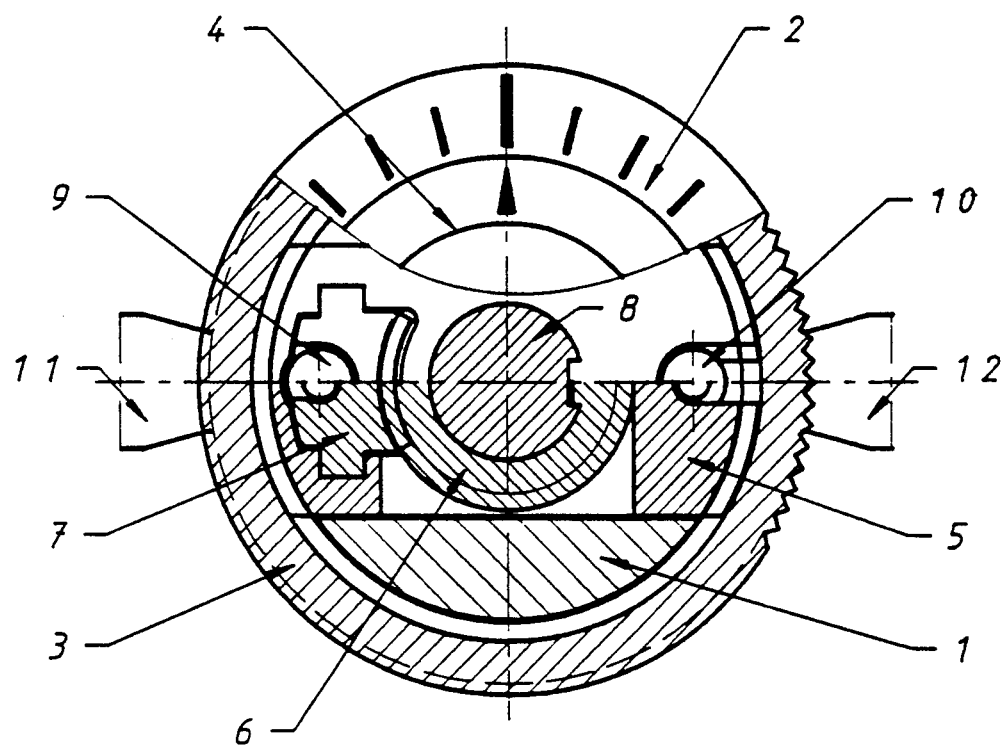

FIG. 1 shows a longitudinal section through the central focusing device for binoculars, and FIG. 2 shows a cross section through the central focusing device.

The figures indicate that the central focusing device for binoculars comprises a diopter adjusting wheel 4 integrated into the face of focusing drive wheel 3, whereby the focusing and the diopter adjustment can be performed independently of each other.

For focusing, one rotates focusing drive wheel 3 which is rotatably mounted on drive wheel housing 1 and on diopter scale ring 2. Bridge member 5 is shifted in the axial direction via inside thread 13 of focusing drive wheel 3 and outside thread 14 of said bridge member 5. On the one hand, bridge member 5 is connected with connecting rod 10. On the other hand, bridge member 5 is axially coupled with connecting rod 9 via threaded segment 7 and threaded spindle 6. The left and right focusing lenses or groups of focusing lenses are adjusted via drivers 11, 12 which are connected axially in form closure with connecting rods 9, 10.

The diopter adjustment takes place via diopter adjusting wheel 4 rotatably mounted on diopter scale ring 2. Threaded spindle 6 is driven by coupling shaft 8 connected with diopter adjusting wheel 4. Threaded spindle 6 communicating with coupling shaft 8 is displaceable in the axial direction on coupling shaft 8 and mounted free from play in bridge member 5. Upon operation of diopter adjusting wheel 4 threaded spindle 6 moves threaded segment 7 guided in bridge member 5 in the axial direction. The axial motion is transmitted to only one focusing lens or group of focusing lenses via driver 11 and connecting rod 9 connected with threaded segment 7. The diopter adjustment can be read on diopter scale ring 2.

I claim:

1. Binoculars having a central device for focusing and diopter adjustment wherein a focusing drive wheel (3) is mounted rotatably on a drive wheel housing (1), one bridge member (5) is axially displaceable via an inside thread (13) of the focusing drive wheel (3) and an outside thread (14) of said bridge member (5), said bridge member (5) is connected with a first connecting rod (10), on the one hand, and axially coupled with another connecting rod (9) via a threaded segment (7) and a threaded spindle (6), on the other hand, the threaded spindle (6) is driven via a rotatably mounted diopter adjusting wheel (4) and a coupling shaft (8) connected therewith, the threaded spindle (6) communicating with the coupling shaft (8) is mounted free from play in the bridge member (5) in the axial direction, and upon operation of the diopter adjusting wheel (4) the threaded segment (7) guided in the bridge member (5) is movable in the axial direction, and the threaded segment (7) is connected with the other connecting rod (9).

2. The binoculars of claim 1, characterized in that the diopter adjusting wheel (4) is mounted rotatably over a diopter scale ring (2).

* * * * *